(12) United States Patent
Ben-Rubi

(10) Patent No.: US 10,163,135 B2
(45) Date of Patent: Dec. 25, 2018

(54) COMBINING USER CONTENT WITH SUPPLEMENTAL CONTENT AT A DATA STORAGE DEVICE

(75) Inventor: Rafi Ben-Rubi, Rosh Ha'ayin (IL)

(73) Assignee: SANDISK IL LTD., Kfar Saba (IL)

(*) Notice: Subject to any disclaimer, the term of this patent is extended or adjusted under 35 U.S.C. 154(b) by 111 days.

(21) Appl. No.: 13/054,536

(22) PCT Filed: May 21, 2010

(86) PCT No.: PCT/IB2010/001220
§ 371 (c)(1),
(2), (4) Date: Jan. 17, 2011

(87) PCT Pub. No.: WO2011/110893
PCT Pub. Date: Sep. 15, 2011

(65) Prior Publication Data
US 2011/0238507 A1    Sep. 29, 2011

Related U.S. Application Data

(60) Provisional application No. 61/312,031, filed on Mar. 9, 2010.

(51) Int. Cl.
*H04N 21/458* (2011.01)
*H04N 5/76* (2006.01)
(Continued)

(52) U.S. Cl.
CPC ........... *G06Q 30/0277* (2013.01); *G06F 7/00* (2013.01); *H04N 7/025* (2013.01); *H04N 21/458* (2013.01);
(Continued)

(58) Field of Classification Search
USPC ............... 705/14.73; 707/321, 621; 711/162
See application file for complete search history.

(56) References Cited

U.S. PATENT DOCUMENTS 6,115,784 A * 9/2000 Dorricott .............. G06F 3/0608
710/6
6,401,214 B1 * 6/2002 Li .......................... G06F 11/004
711/112
(Continued)

FOREIGN PATENT DOCUMENTS

WO    2008016440 A1    2/2008
WO    2008067498 A2    6/2008
(Continued)

OTHER PUBLICATIONS

Porta, Charles Della et al. "The Advertising Display System (ADS)," School of Electrical Engineering and Computer Science, University of Central Florida, Orlando, Florida, http://www.eecs.ucf.edu/seniordesign/su2007fa2007/g03/Group%g03%20Conference%20Paper.pdf, 2007, 8 pages.
(Continued)

*Primary Examiner* — Eric R Netzloff
*Assistant Examiner* — Dipen M Patel
(74) *Attorney, Agent, or Firm* — Vierra Magen Marcus LLP

(57) ABSTRACT

Data storage devices and methods to combine user content with supplemental content at a data storage device are disclosed. The data storage device includes a host interface, a controller coupled to the host interface, a first storage area coupled to the controller, and a second storage area coupled to the controller. The host interface is configured to enable the data storage device to receive one or more user content items from a host device when the data storage device is operationally coupled to the host device. The controller is configured to store the one or more user content items in the first storage area. The controller is also configured to combine a particular supplemental content item stored in the
(Continued)

second storage area with a particular user content item from among the one or more user content items.

45 Claims, 9 Drawing Sheets

(51) Int. Cl.
*G06F 12/16* (2006.01)
*H04N 7/025* (2006.01)
*G06F 7/00* (2006.01)
*G06Q 30/02* (2012.01)

(52) U.S. Cl.
CPC ...... *G06F 12/16* (2013.01); *G06F 2213/0038* (2013.01); *H04N 5/76* (2013.01)

(56) References Cited

U.S. PATENT DOCUMENTS

| | | | |
|---|---|---|---|
| 6,483,986 | B1 | 11/2002 | Krapf |
| 6,721,955 | B2* | 4/2004 | Khoo et al. ............... 725/46 |
| 6,944,298 | B1* | 9/2005 | Rhoads ............ G06Q 20/341 380/205 |
| 6,986,154 | B1 | 1/2006 | Price et al. |
| 7,249,365 | B1 | 7/2007 | Price et al. |
| 7,263,709 | B1 | 8/2007 | Krapf |
| 7,330,196 | B2* | 2/2008 | Ishihara ................ 345/631 |
| 7,774,330 | B2* | 8/2010 | Kalaboukis et al. ......... 707/705 |
| 8,065,277 | B1* | 11/2011 | Gardner et al. ............. 707/673 |
| 8,079,045 | B2 | 12/2011 | Krapf et al. |
| 8,108,342 | B2* | 1/2012 | Salinas et al. ................ 707/621 |
| 8,452,934 | B2* | 5/2013 | Jogand-Coulomb ...................... G06F 13/4243 711/102 |
| 9,122,643 | B2* | 9/2015 | Herz ............ G06F 11/1464 |
| 2001/0009602 | A1 | 7/2001 | Nakayama |
| 2002/0009079 | A1* | 1/2002 | Jungck et al. ............... 370/389 |
| 2002/0057900 | A1* | 5/2002 | Nakajima ............. H04H 60/16 386/252 |
| 2003/0112276 | A1* | 6/2003 | Lau et al. .................... 345/764 |
| 2003/0181201 | A1 | 9/2003 | Bomze et al. |
| 2006/0242016 | A1 | 10/2006 | Chenard |
| 2007/0112762 | A1 | 5/2007 | Brubaker |
| 2007/0124662 | A1 | 5/2007 | Streuter et al. |
| 2007/0130003 | A1 | 6/2007 | Davis et al. |
| 2007/0130521 | A1 | 6/2007 | Gonzalez et al. |
| 2007/0136541 | A1* | 6/2007 | Herz ................... G06F 11/1466 711/162 |
| 2007/0150887 | A1 | 6/2007 | Shapiro |
| 2007/0210162 | A1* | 9/2007 | Keen et al. ................... 235/451 |
| 2008/0037824 | A1* | 2/2008 | Rhoads ............... G06Q 20/341 382/100 |
| 2008/0040768 | A1 | 2/2008 | Robotham |
| 2008/0046920 | A1* | 2/2008 | Bill ............................... 725/34 |
| 2008/0109222 | A1 | 5/2008 | Liu |
| 2008/0276065 | A1* | 11/2008 | Jeong ................. G06F 12/0246 711/173 |
| 2009/0106200 | A1 | 4/2009 | Salinas et al. |
| 2009/0232354 | A1 | 9/2009 | Camp, Jr. et al. |
| 2011/0313972 | A1* | 12/2011 | Albouze ....................... 707/624 |
| 2012/0005015 | A1* | 1/2012 | Park et al. ................. 705/14.46 |
| 2013/0006759 | A1 | 1/2013 | Srivastava et al. |
| 2014/0108158 | A1 | 4/2014 | Athsani et al. |

FOREIGN PATENT DOCUMENTS

| | | |
|---|---|---|
| WO | 2009032993 A2 | 3/2009 |
| WO | 2009113992 A1 | 9/2009 |

OTHER PUBLICATIONS

International Search Report and Written Opinion for International Application No. PCT/IB2010/001220 dated Sep. 22, 2010, 12 pages.
Communication Pursuant to Article 94(3) EPC dated Jun. 21, 2013 in European Application No. 10728884.7, 4 pages.
International Preliminary Report on Patentability for International Application No. PCT/IB2010/001220, dated Sep. 11, 2012, 5 pages.
Office Action dated Aug. 27, 2014 in Chinese Application No. 201080065136.0 with English translation, 17 pages.
Office Action dated Apr. 13, 2015 issued in Chinese Application No. 201080065136.0, with English translation, 6 pages.

* cited by examiner

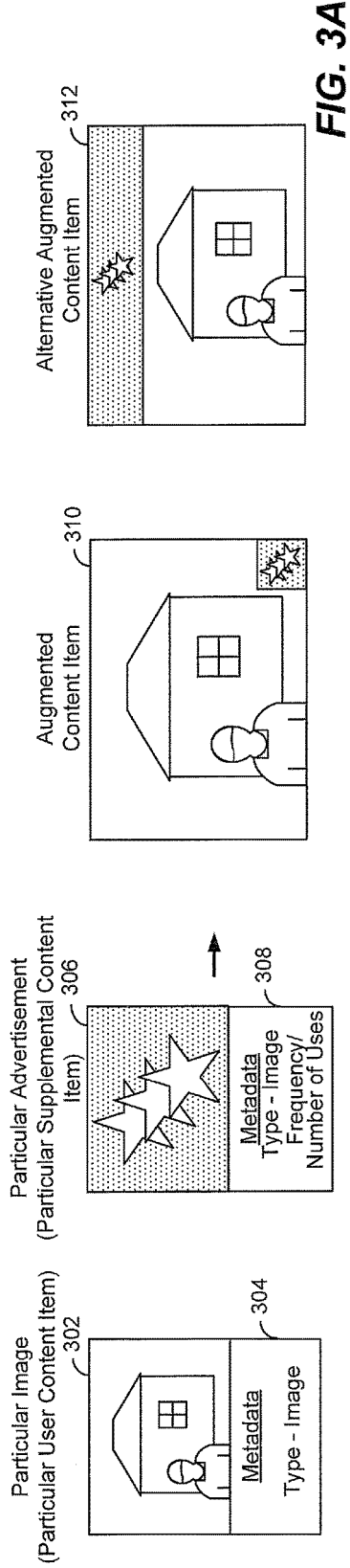

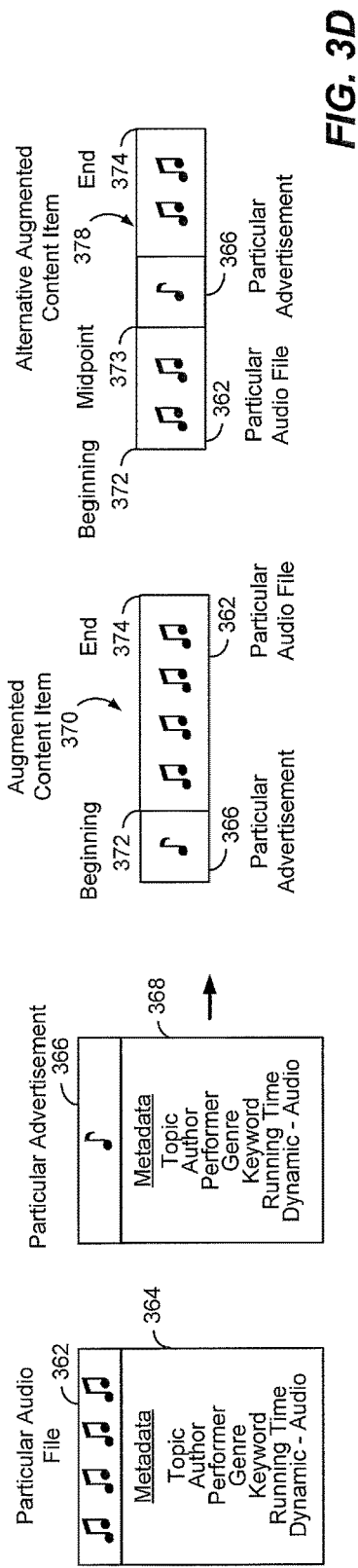
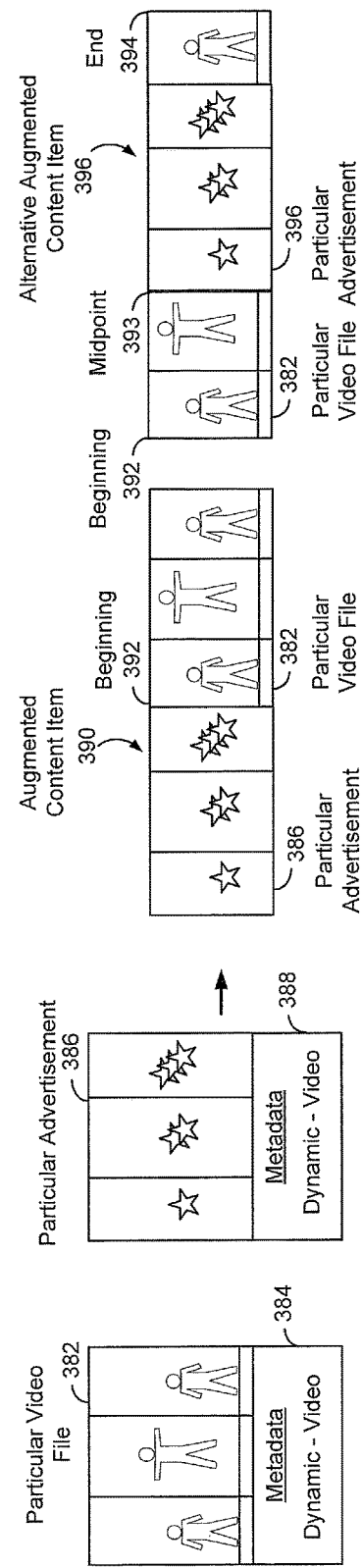
FIG. 3D
FIG. 3E

COMBINING USER CONTENT WITH SUPPLEMENTAL CONTENT AT A DATA STORAGE DEVICE

FIELD OF THE DISCLOSURE

The present disclosure is generally related to combining a user content item with a supplemental content item, such as an advertisement.

BACKGROUND

Providers of goods and services continually seek new channels through which to advertise their products. Users of computers and personal electronics, such as media players, game devices, wireless telephones, and similar devices may be amenable to ways to defray the cost of using those devices or to reduce the cost of accessories for those devices.

Advertisers may distribute promotional materials for goods and services they seek to promote by providing data storage devices, such as memory cards or Universal Serial Bus flash drives, with promotional content stored on the data storage devices. Just as mass media programs or publications are provided for free or at a reduced cost to the public because they are subsidized by the advertisements included therein, the data storage devices may be subsidized by the advertisers and provided for free or at a reduced cost. Consumers may appreciate having the reduced cost or free data storage devices. However, even if the promotional content is stored on the data storage devices when they are distributed, the advertisers have no assurance that the users will access the promotional content or that the users will not erase the promotional content from the data storage device to free storage for user files.

SUMMARY

Data storage devices and methods to combine advertisements or other supplemental content stored on a data storage device with user content items stored on the data storage device are disclosed. The data storage device stores supplemental content, such as an advertisement, separately from a user data area. After user content is stored to the data storage device, the data storage device augments the user content with supplemental content prior to display or playback of the user content. Selection and placement of the supplemental content may be determined according to rules (such as rules for selecting supplemental content that is compatible with the user content).

BRIEF DESCRIPTION OF THE DRAWINGS

FIGS. 3A-3E are diagrams illustrating supplemental image, text, audio, and video content items combined with user content items to generate augmented content items with supplemental content items in various positions relative to the user content items;

DETAILED DESCRIPTION

Figure 1:
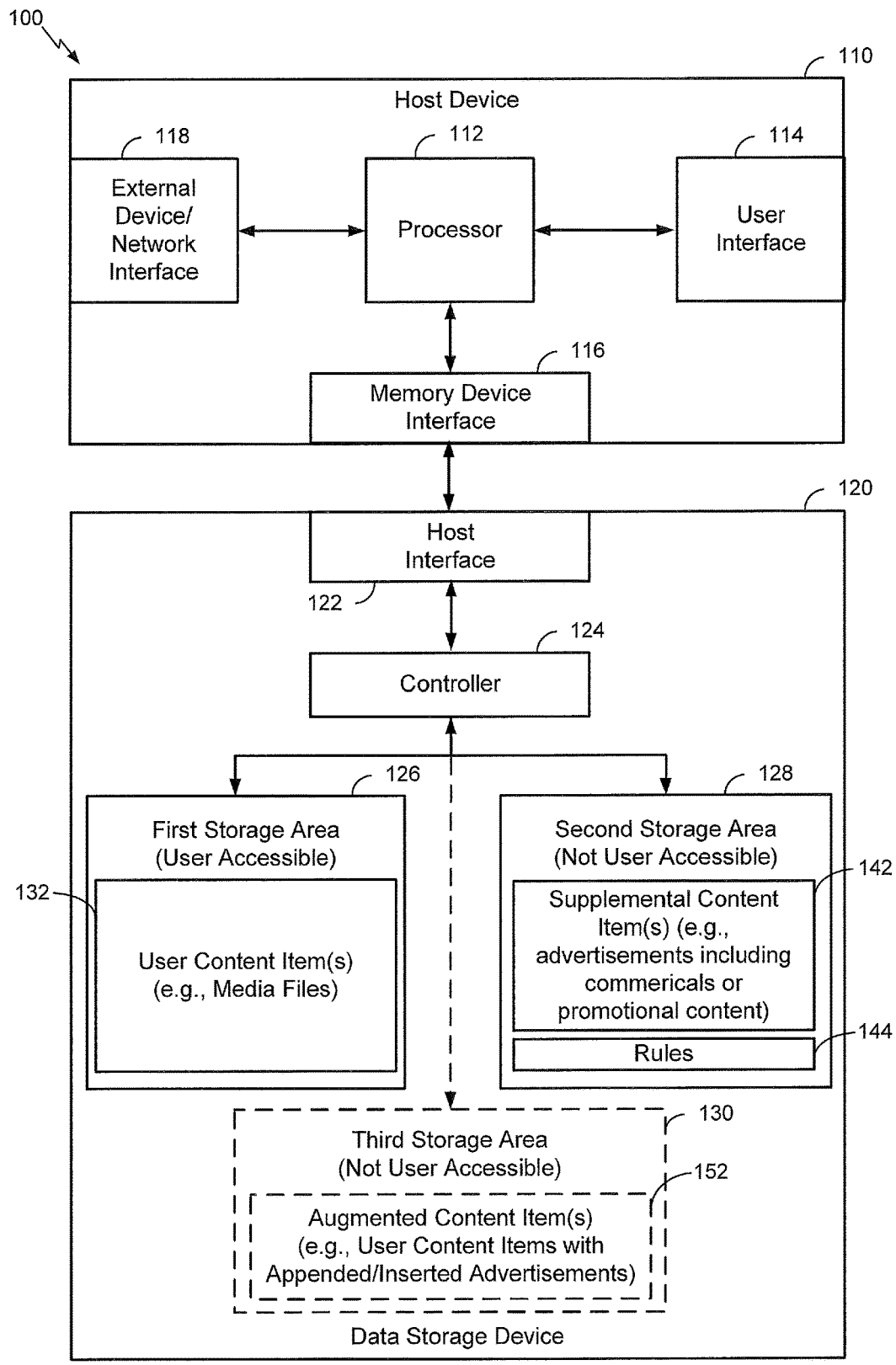
FIG. 1 is a block diagram of a data storage device in communication with a host device in which the data storage device includes a second storage area in which supplemental content items are stored.

Referring to FIG. 1, a particular embodiment of a system to combine user content with supplemental content is depicted and generally designated 100. The system 100 includes a host device 110 operatively coupled to a data storage device 120. The data storage device 120 is configured to selectively combine one or more user content items 132 with one or more supplemental content items 142, such as advertisements, and to generate augmented content items 152 that include both a user content item and a supplemental content item. As a result, when a request is made to the data storage device 120 to retrieve the user content item 132, the data storage device 120 may return the augmented content item 152 that includes the requested user content combined with one or more advertisements or promotional items.

The host device 110 is illustrated as including a processor 112 that is coupled to a user interface 114, a memory device interface 116, and an external device or network interface 118. For example, the host device 110 may include a portable computer, a wireless telephone, a wireless network device, a media player, a game device, a digital camera, a tablet device, any other host device that is configured to operatively couple to a data storage device, or any combination thereof. The host device 110 is responsive to instructions and commands received via the user interface 114 and may enable storage of user content items to the data storage device 120 via the memory device interface 116. For example, the host device 110 may include a still camera, a video camera, a microphone, or other content generation device (not shown) to capture user content for storage at the data storage device 120. As another example, the host device 110 may be configured to receive user content via the external device/network interface 118, such as movie files, image files, audio files, other content files, or any combination thereof.

The host device 110 is further responsive to commands received via the user interface 114 to request content to be retrieved from storage at the data storage device 120. For example, the user interface 114 may receive a command from a user of the host device 110 to retrieve an image file previously stored at the data storage device 120. In response, the host device 110 may send a request for data access to the data storage device 120 for retrieval of the image file. As another example, the host device 110 may be configured to access a file system of the data storage device 120 to retrieve a listing of available files that can be accessed by the host device 110 and the listing of available files may be displayed or otherwise presented to the user. The user interface 114 may include a display, an audio speaker, or another device to enable presentation of media content retrieved from the data storage device 120.

The data storage device 120 includes a host interface 122 and a controller 124 coupled to the host interface 122. The controller 124 is coupled to a first storage area 126, a second storage area 128, and a third storage area 130. The first storage area 126 is accessible to a user of the host device 110 and stores one or more user content items 132, such as one or more media files. The second storage area 128 is not accessible to the user and stores one or more supplemental content items 142, such as advertisements, promotional items, or other content that an advertiser or other organization may desire to provide to a user of the data storage device 120. Firmware of the controller 124 may be modified to maintain the separate storage areas 126, 128, and 130, and to restrict user access to the second storage area 128. The first storage area 126, the second storage area 128, and the third storage area 130 each may be implemented in a non-volatile memory device or a volatile memory device.

The host interface 122 is configured to enable the data storage device 120 to receive one or more user content items from the host device 110 when the data storage device 120 is operationally coupled to the host device 110. The host interface 122 is further configured to enable the controller 124 to store the one or more user content items 132 in the first storage area 126. For example, when the data storage device is implemented in a non-volatile memory device, the data storage device 120 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), a CompactFlash® (CFO) card (trademark of SanDisk Corporation, Milpitas, Calif.), or a solid-state drive (SSD). In other implementations, the data storage device 120 may be an external removable storage device, such as a Universal Serial Bus (USB) flash drive (UFD). The data storage device 120 may be embedded within the host device 110 or may be configured to be removably coupleable to the host device 110 via the host interface 122. As another example, the data storage device 120 may be wirelessly coupled to the host device 110 via the host interface 122, such as via a wireless USB or ad-hoc piconet (e.g., Bluetooth®, trademark of Bluetooth SIG, Inc., Bellevue, Wash.).

The controller 124 is configured to combine a particular supplemental content item from among the one or more supplemental content items 142 with a particular user content item from among the one or more user content items 132 to generate an augmented content item 152. As used herein, a content item is "augmented" when both the original content of the item and supplemental content (e.g. advertisements) are provided during playback of the content item. In the embodiment illustrated in FIG. 1, the augmented content item 152 may be stored in the third storage area 130 that, like the second storage area 128, is not user accessible. The controller 124 may generate the augmented content item 152 independently of receiving any commands from the host device 110, and instead may generate the augmented content item 152 in response to a write operation being performed to the first storage area 126, a period of read and write inactivity at the data storage device 120, or in response to initiating a "garbage collection process" (e.g., a storage reclamation procedure to enable erasure of one or more sets of memory blocks from a first memory location by copying valid data from the sets of memory blocks). In an alternative embodiment, the data storage device 120 may not include the third storage area 130, and instead the controller 124 may be configured to generate the augmented content item 152 in response to a request from the host device 110 for access to the user content item 132. The controller 124 may be configured to generate the augmented content item 152 "on the fly" as the user content item 132 is retrieved from the first storage area 126 in response to the request from the host device 110.

By enabling the data storage device 120 to store user content items 132 and to modify the user content items 132 to include one or more advertisements or other supplemental content items 142 that may be provided by a supplier of the data storage device 120, the user may receive an operational storage device that may be used to freely store user content. A provider of the advertisements or other supplemental content items 142 may be able to designate advertisements or other supplemental content items 142 to be added to the user content items 132. To illustrate, the cost to make and distribute the data storage device 120 may be partially or wholly financed or offset by fees paid by an advertiser. The advertiser may benefit from usage of the data storage device 120 by the user due to presentation of advertisements, promotional content, or other supplemental content items 142 provided with the data storage device 120 that are presented with the user content items 132 upon retrieval of the user content items 132 from the data storage device 120. In addition, or alternatively, by having the data storage device 120 configured to generate the augmented content items 152 including the supplemental content items 142, such functionality may be performed without implementing hardware or software changes on the host device 110.

Figure 2:
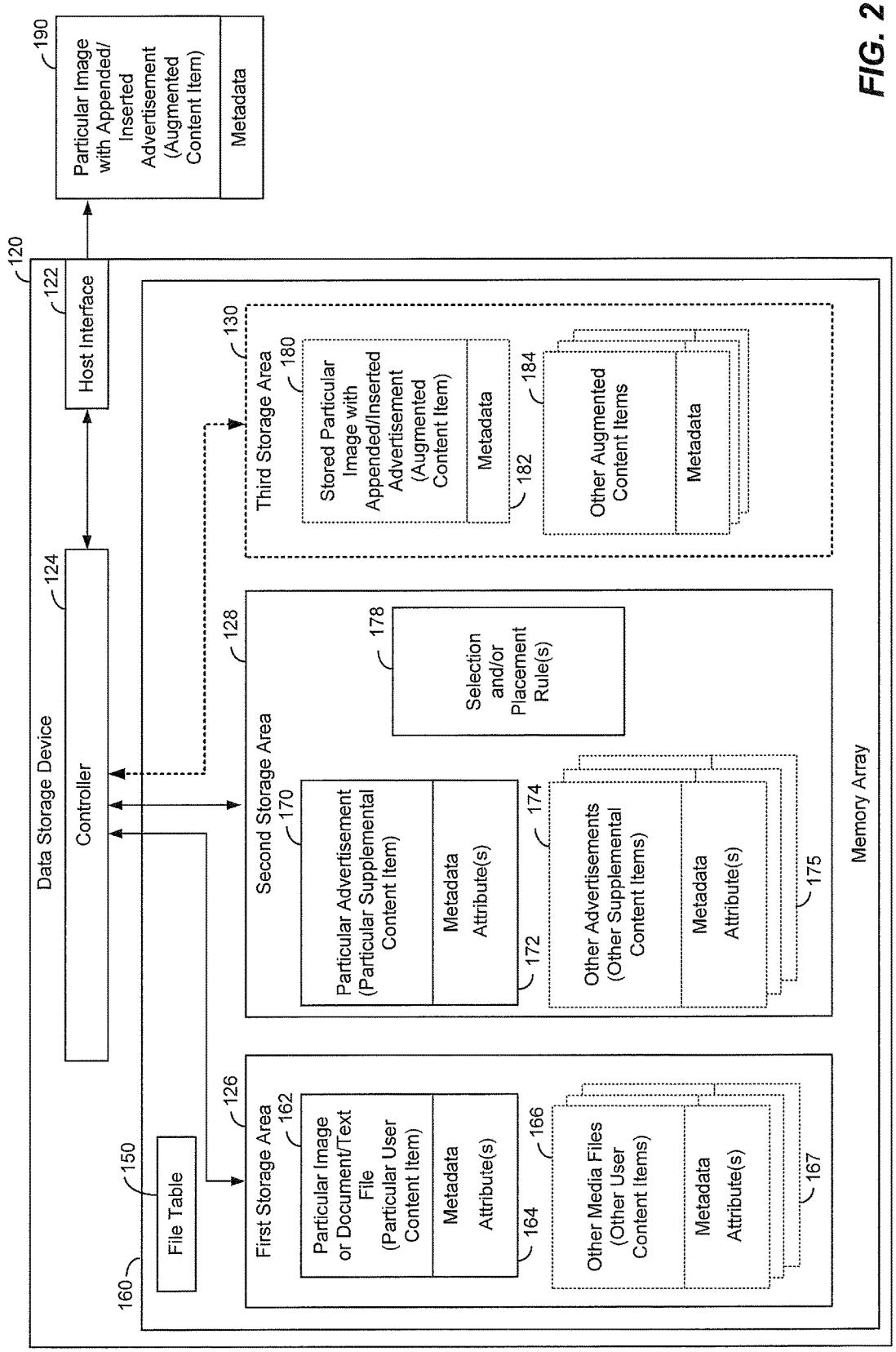
FIG. 2 is a block diagram of the data storage device of FIG. 1 in which a particular supplemental content item is matched to a user content item by metadata and a resulting augmented content item is presented via the host device.

Referring to FIG. 2, a second embodiment of the data storage device 120 of FIG. 1 is depicted. The data storage device 120 includes the host interface 122 coupled to the controller 124. The first storage area 126 and the second storage area 128 are inside a memory array 160, such as a flash memory array, that is coupled to the controller 124. The third storage area 130 is also inside the memory array 160. The memory array 160 also includes a file table 150, such as a file allocation table (FAT) or other file directory that identifies locations in the data storage device 120 from which the user content items 132 may be accessed.

The first storage area 126 stores a particular user content item (also referred to herein as a particular image as a representative example) 162 that has associated metadata 164, such as one or more attributes of the particular user content item 162. The first storage area 126 also includes a plurality of other user content items (also referred to herein as other media files as a representative example) 166. One or more of the other media files 166 may be associated with corresponding metadata 167, such as one or more attributes of the other media files 166. The first storage area 126 may be implemented, for example, as a public partition of the memory array 160 that is accessible to any user of the data storage device 120.

The second storage area 128 includes a particular supplemental content item (also referred to herein as a particular advertisement as a representative example) 170, that has associated metadata 172 including one or more attributes associated with the particular supplemental content item 170. The second storage area 128 also includes a plurality of other supplemental content items (also referred to herein as one or more other advertisement as a representative example) 174 with associated metadata 175, such as one or more attributes of the other supplemental content items 174. The second storage area 128 further stores selection and/or placement rules 178. The selection and/or placement rules 178 may be accessed by the controller 124 to control selection of the particular advertisement 170 from the plurality of other supplemental items 174 and for placement of the particular advertisement 170 within the particular user content item 162.

The second storage area 128 may have restricted access. For example, the second storage area 128 may be accessible to the provider of the supplemental content, such as an advertiser or other promoter, but not to an end user of the data storage device 120. The storage device 120 may be configured to receive an advertisement command from an external device via the host interface 122. The advertisement command may indicate an authentication of the provider of the supplemental content for storage within the second storage area 128. The controller 124 may further be configured to receive the selection and/or placement rules 178 via an advertisement command. The advertisement command may bear indicia that the command is presented by a provider of selection and/or placement rules that is authorized to update the rules 178 within the second storage area 128.

The third storage area 130 is illustrated inside the memory array 160. The third storage area 130 includes a particular augmented content item (also referred to herein as a stored particular image as a representative example) 180, such as the stored particular image 162 that has been combined with the particular advertisement 170 as a stored particular image 180 with associated metadata 182. One or more other augmented content items 184 are also illustrated as stored within the third storage area 130. The third storage area 130 may be restricted to prevent a user from storing content in the third storage area 130. As such, the controller 124 may be configured to read user data from the first storage area 126, combine the retrieved user data with supplemental data from the second storage area 128 to generate augmented content items, and write the augmented content items 180 and 184 to the third storage area 130 to be retrievable upon a request for access to the user data item. Although the data storage device 120 is illustrated as including the third storage area 130, in other embodiments the memory array 160 may not include the third storage area 130 and instead the data storage device 120 may generate augmented content items "on the fly" as the user content is retrieved in response to requests for access by a host device.

The controller 124 may be configured to add an indicator to the metadata of the augmented content items (e.g. the metadata 182) to indicate that the content item has been augmented with non-user content, such as a "contain ADS" indicator. Alternatively, the controller 124 may add an indicator or mark at a predefined location within a user data area of the augmented content item. Although the mark may alter the user data, such as by overwriting a particular value or pattern within the user data, the mark may be small enough to be undetectable by a human auditory system (during playback of audio content) or by a human visual system (during playback of image or video content). The controller 124 may be configured to check metadata and/or the particular location of received media files for the "contain ADS" indicator to ensure that additional advertisements are not added to an already-augmented file. For example, when an augmented media file is read from the data storage device 120 and written again to the data storage device 120, the controller 124 may detect the "contain ADS" indicator and not add additional supplemental content items to the file.

The controller 124 may be configured to access one or more of the selection and/or placement rules 178 to determine a selection and/or placement of one of the supplemental content items 170 and 174 within the particular user content item 162. For example, the selection and/or placement rules 178 may include one or more rules that direct at least one of a choice of the particular supplemental content item 170 and placement of the particular advertisement 170 relative to a particular user content item 162 in the augmented content item 180. For example, the selection and/or placement rules 178 may determine placement of the particular advertisement 170 relative to the particular image 162 within the augmented content item (also referred to herein as the particular image with appended or inserted advertisement as an example) 190.

For the particular user content item 162 and the other user content items 166, the metadata 164 and 167, respectively, may indicate one or more attributes of the particular user content item 162 or the other user content items 166. For example, the metadata 164 may indicate that the particular user content item 162 has a particular media type, such as a static type (e.g., an image type or a document/text type). The controller 124 may be configured to access the selection and/or placement rules 178 to determine that an appropriate advertisement to be added to the particular image 162 would be an advertisement having a similar media type. The controller 124 may be configured to locate the particular advertisement 170 from among the advertising content stored in the second storage area 128 for selection to be used to augment the particular image 162.

The particular supplemental content item 170 may of the same media type as the particular user content item 162 or of a compatible media type. For example, the media type may include one or more of a static type, such as an image type or a document/text type, and a dynamic type, such as an audio type or a video type. To illustrate, an image type may include Joint Photographic Expert Group (JPEG) image file format data, while an audio type may include a Motion Picture Expert Group (MPEG) Audio Layer 3 (MP3) format data and a video type may include a Motion Picture Expert Group (MPEG) 4 (MP4) format data.

When the particular user content item 162 is of the image type or the document or text type, the particular supplemental content item 170 may also be of the image type or of the text type and the augmented content item 190 may include the particular supplemental content item 170 superimposed over a specified portion of the particular user content item 162. For example, the particular supplemental content 172 may be positioned in a specified corner or along a specified edge of a user image, as is illustrated in FIG. 3A, FIG. 3B, and FIG. 3C. The selection and placement rules 178 may limit selection of the particular supplemental content item 170, for example, to a supplemental content item that has a size that is not more than ten percent of the size of the particular user content item 162. Alternatively, the selection and placement rules 178 may direct the controller 124 to scale a size of the particular supplemental content item 170 so that the particular supplemental content item 170 spans not more than ten percent of the particular user content item 162 when the particular supplemental content item 170 is combined with the particular user content item 162.

As another example, when the particular user content item 162 is of the dynamic type (e.g., an audio type or a video type), the particular supplemental content item 170 may be of a same dynamic type and the augmented content item 190 includes the particular supplemental content item 170 either appended to a beginning of the particular user content item 162 or inserted within the user content audio or video file between a beginning and an end of the particular user content item 162, as is illustrated in FIG. 3D and FIG. 3E.

As another example, the particular supplemental content item 170 may have a running time that is not more than a specified portion of a running time of the particular user content item 162. For example, when the particular user content item 162 is an audio file, the metadata 164 may indicate that a running time of the audio file is three minutes. The particular supplemental content item 170, such as an audio commercial to be included in the augmented content item 190, may be constrained to a duration that does not exceed a specified commercial duration or a specified portion of the running time of the particular user content item 162. To illustrate, the particular supplemental content item 170 may be limited to a duration of not more than ten seconds or of not more than two percent of the three minute running time, as illustrative, non-limiting examples.

The controller 124 may be responsive to the selection and/or placement rules 178 to choose the particular supplemental content item 170 from the plurality of supplemental content items 174 based on matching one or more attributes of the metadata 172 associated with the particular supplemental content item 170 with one or more attributes of the metadata 164 associated with the particular user content item 162. For example, the metadata 164 of the particular user content item 162 and the metadata 172 of the particular advertisement 170 may include attributes such as a topic, an author, a performer, a genre, or a keyword. When the particular user content item 162 is an audio file and an attribute of the metadata 164 of the particular user content item 162 identifies the performer, the particular supplemental content item 170 that is selected may be selected based on an attribute of the metadata 172 listing the same performer. Similarly, the selection of the particular supplemental content item 170 may be based on matching an attribute of the metadata 164 of the particular user content item 162 that identifies the genre of the audio file or some other attribute.

The selection and/or placement rules 178 may specify criteria regarding a number of times each of the plurality of supplemental content items 174 is used to augment user content within the storage device 120, or a frequency with which each of the plurality of supplemental content items 174 is used to augment user content in relation to others of the plurality of supplemental content items 174. To illustrate, a provider of the data storage device 120 may enable advertisers to provide advertisements and to specify a number of usages of the advertisements within augmented user content. After a specified number of insertions of each advertisement within retrieved user data, a particular advertisement may no longer be selected for insertion into user content to generate augmented content. As another example, a frequency of insertion of one or more particular advertisements may be specified. As another example, an order of use or tracking data indicating a most recently used and least recently used status of one or more of the plurality of supplemental content items 174 may be maintained such that subsequent retrievals of the user content may include a variety of the supplemental content items 174. In this manner, the augmented content item 190 appears "fresh" or "live" as opposed to fixed or repetitive. Alternatively, or in addition, the number or frequency of uses of a particular advertisement may be specified by a rule based on a fee or other consideration provided by the advertiser.

The controller 124 may be configured to maintain the second storage area 128 as a hidden area. For example, the second storage area 128 may be maintained as a hidden partition that is accessible only to authenticated users having authority to access the second storage area 128. For example, the second storage area 128 may be maintained as a TrustedFlash™ hidden partition within the memory array 160. At least a portion of content of the second storage area 128 may be updated via the host interface 122. For example, the content of the second storage area 128 may be updated via a host command received by the host interface 122. The host command to update the content of the second storage area 128 may include authentication information to distinguish the originator of the command from the end-user of the device. For example, access to update data in the second storage area 128 may be restricted to advertisement providers and service providers that may send updated data to the data storage device 120 via the host device 110 from a remote network device (not shown in FIG. 2). Conversely, access to the first storage area 126 may be open to any user of the data storage device 120.

The controller 124 may be configured to access and maintain the file table 150 to effectuate locating the particular user content item 162, locating insertion points into which the particular supplemental content item 170 may be added or appended, and to locate the augmented content item 180 after storage of the augmented content item 180 to the third storage area 130. For example, the file table 150 may be a file allocation table (FAT) that is accessible to or maintained by the controller 124.

The controller 124 may be configured to access the file table 150, which may include a FAT table and one or more directory entries in a FAT file system or FAT32 file system implementation. For example, after selecting the particular advertisement 170 to be inserted into or appended to the particular user content item 162, the controller 124 may locate portions of the particular user content item 162 that may be stored throughout the memory array 160 as indicated by the FAT table. The controller 124 may locate a specific insertion point within the particular user content item 162 based on a location within one or more consecutive regions of data corresponding to the selected user content item 162. For example, a region of data may correspond to a cluster, a logical block address (LBA), a block, a page, a sector, or other unit. The controller 124 may append, overwrite, or otherwise redirect pointers within the file system to insert the particular supplemental content of the particular supplemental content item 170 to generate the augmented content item 190.

After generation of the augmented content item 190, the controller 124 may be configured to update the file table 150. For example, the controller 124 may update the file table 150 by modifying a directory entry corresponding to the particular user content item 162 to point to a file location associated with the particular augmented content item 180 stored within the third storage area 130. The file table 150 may be used when the host device 110 requests access to the particular user content item 162. As another example, the controller 124 may update the file table 150 to indicate one or more clusters within a chain of clusters within a cluster allocation table of a FAT system.

The first storage area 126 and the second storage area 128 may each be in a separate partition within a single memory array within the data storage device 120. Alternatively, the first storage area 126 and the second storage area 128 may be located in separate memory arrays within the data storage device 120. If the third data storage area 130 is used, the third data storage area 130 may be in a separate memory array in the data storage device 120. Alternatively, the third data storage area 130 may be in a separate partition in a same memory array that includes the first data storage area 126, the second data storage area 128, or both the first data storage area 126 and the second data storage area 128.

Referring to FIGS. 3A-3E, embodiments of creation of augmented content items using particular user content items and particular supplemental content items are depicted for a variety of media types. FIG. 3A depicts a particular user content item (also referred to herein as a particular image, as an example) 302 with associated metadata 304 identifying a media type of the particular user content item 302 as an image type. A particular supplemental content item 306 is a particular advertisement having metadata 308 indicating that the particular advertisement 306 is appropriate for inclusion within or augmentation to file types of the image type or, possibly, another static type, such as a text type. The metadata 308 also includes data corresponding to a frequency of use or number of uses of the particular advertisement 306. FIG. 3A further shows a simplified illustration of overlaying the particular advertisement 306 within the particular image 302 to generate an augmented content item 310.

To illustrate, one or more blocks of a JPEG file may be identified by the controller 124 of FIG. 1, and data corresponding to the identified blocks corresponding to a lower right hand corner of the particular image 302 may be deleted and replaced with data corresponding to the particular advertisement 306. In a particular illustrative embodiment, the controller 124 only modifies blocks of the JPEG file of the particular image 302 that are to be replaced as part of combining the particular advertisement 306 with the particular image 302. For example, if the particular image 302 includes a bitmap (BMP) file, the controller 124 may only modify lines of the particular image 302 that are to be replaced as part of combining the particular advertisement 306 with the particular image 302. As another example, rather than deleting the original content and replacing it with the particular advertisement content, the particular advertisement 306 may be overlaid, such as in a meshing or merging operation. In either case, when the augmented content item 310 is presented to a host device as a particular image with an appended or inserted advertisement 190 (FIG. 2) or is stored in a third storage area 130 (FIG. 2), the augmented content item 310 is presented or stored as a same media type as the particular user content 302 (i.e., in the example of FIG. 3A, as a JPEG image file).

An alternate augmented content item 312 is also illustrated showing the particular advertisement 306 appended as a banner advertisement in an upper portion of the particular image 302. To illustrate, the particular advertisement 306 may be appended to the particular image 302, increasing the total size of the alternative augmented content item 312 to be larger than the particular image 302, while preserving an aspect ratio of the particular image 302. In another example, an aspect ratio of the particular image 302 may be adjusted so that the alternative augmented content item 312 maintains an original dimension of the image. To illustrate, the controller 124 may shrink or crop the particular image 302 to adhere to a size constraint.

A supplemental content item and the particular user content item may have different specific types but may be otherwise compatible. For example, if both the particular user content item and the supplemental content item are of static media types, such as images or text files, the particular user content item may be combined with the supplemental content item even though the specific media types (e.g., image as opposed to text) are different.

FIG. 3B illustrates the particular image 302 with the associated metadata 304 identifying a media type of the particular image 302 as an image type. A particular advertisement having metadata 328 indicating that the particular advertisement 326 is of a text type. The text type of the particular advertisement 326 may be appropriate for inclusion within or augmentation to user content of the text type or another static type, such as an image type. The metadata 328 also includes data corresponding to a frequency of use or number of uses of the particular advertisement 326. FIG. 3B further shows a simplified illustration of overlaying the particular advertisement 326 within the particular image 302 to generate an augmented content item 330. To illustrate, one or more blocks of a JPEG file may be identified by the controller 124 of FIG. 1, and data corresponding to the identified blocks corresponding to a portion of the particular image 302 toward an upper right hand corner of the particular image 302 may be deleted and replaced with data corresponding to the particular advertisement 326. As another example, in an alternative augmented content item 332, the particular advertisement 326 may be overlaid over a portion of the original image 302, such as in a meshing or merging operation.

FIG. 3C depicts the particular user content item as a particular text file 342 with the associated metadata 344 identifying a media type of the particular user content item as a text type. A particular supplemental content item 346 is a particular advertisement having metadata 348 indicating that the particular advertisement 346 is of a text type that is appropriate for inclusion within or augmentation to user content of the text type. The metadata 348 also includes data corresponding to a frequency of use or number of uses of the particular advertisement 346. FIG. 3C further shows a simplified illustration of overlaying the particular advertisement 346 within the particular text file 342 to generate an augmented content item 350. To illustrate, a portion of the text file 342, such as one or specified lines or other positions in a text file, may be identified by the controller 124 of FIG. 1, and data corresponding to the particular advertisement 346 may be inserted within the particular text file 342. As another example, in an alternative augmented content item 352, a particular advertisement of an image type may be inserted at a specified location in the particular text file 342. The supplemental content item 346 may be included in a header, a footer, or a margin of the particular text file 342, or superimposed as a watermark within the particular text file 342.

FIG. 3D illustrates an example of a particular audio file 362 having metadata 364. The metadata 364 may include information descriptive of the particular audio file 362, such as a topic, an author, a performer, a genre, a keyword, a running time, or a media type. The media type may be a dynamic media type illustrated as an audio type. The particular audio file 362 may be combined with a particular advertisement 366 having associated metadata 368 which may include a topic, author, performer, genre, keyword, running time, and media type (e.g., a dynamic type, such as the audio type). An example of an augmented content item 370 includes the particular advertisement 366 inserted before a beginning portion 372 of the particular audio file 362.

For example, the controller 124 may decode at least a portion of the particular audio file 362, traverse the particular audio file 362, and update indices that are used to playback the particular audio file 362 to append or insert the particular advertisement 366. The controller 124 parses a sync word that identifies a start of a frame in the particular audio file 362 and parses a bit rate to combine the particular advertisement 366 with the audio file 362 in a way that enables the augmented content item 370 including the particular advertisement 366 to be recognizable by a playback device. When the augmented content item 370 is presented to a host device or is stored in a third storage area 130 (FIG. 2), the augmented content item 370 is presented or stored as a same media type as the particular audio file 362 (e.g., as an MP3 file).

To illustrate, the beginning 372 and an end 374 of audio content of the particular audio file 362 may be identified by the controller of the data storage device, and the particular advertisement 366 may be appended prior to the beginning 372. In an embodiment where the augmented content item 370 is stored within the data storage device, the augmented content item 370 may be stored as a single audio file. In another embodiment where the augmented content item 370 is generated "on the fly" as the request for a particular audio file 362 is carried out, the particular advertisement 366 may be provided followed by the particular audio file 362, with run time tracking and other audio content metrics updated such that the audio presented to the host device appears to be a single audio file, without storing the particular audio file 362 and the particular advertisement 366 as a single audio file.

An alternative augmented content item 378 is also illustrated where the particular audio file 362 has the particular advertisement 366 inserted at a midpoint 373 between the beginning 372 and the end 374. Although illustrated as being inserted at the midpoint 373, it will be understood that the insertion of the particular advertisement 366 may appear at any location within the particular audio file 362. The placement rules 178 (FIG. 2) may identify a point in the particular audio file 362 at which the particular advertisement 366 is inserted. The placement rules 178 may specify a fixed location relative to the particular audio file 362 for insertion of the particular advertisement 366, such as at the beginning 372 of the particular audio file 362 or at a point a specified number of minutes or seconds from the beginning 372 of the particular audio file 362.

Alternatively, the placement rules 178 may specify a relative location in the particular audio file 362 at which the particular advertisement 366 is inserted depending on the running time of the particular audio file 362. For example, the placement rules 178 may specify that the particular advertisement 366 be inserted halfway through the particular audio file 362, thirty percent of the way through the particular audio file 362, or at another point relative to the length of the particular audio file 362. The placement rules 178 also may specify the placement of the particular advertisement 366 based on a length of the particular advertisement 366 and the length of the particular audio file 362 so that, for example, an end of the particular advertisement 366 does not extend past the halfway point of the augmented content item 378.

FIG. 3E depicts a particular video file 382 of user content including metadata 384 indicating a media type of the particular video file 382 as a dynamic media type (i.e., the video type). A particular advertisement 386 includes metadata 388 indicating the dynamic video media type. An augmented content item 390 is illustrated as having the particular advertisement 386 preceding the particular video file 382. For example, a beginning 392 of video content of the particular video file 382 may be located, and the particular advertisement 386 may be appended prior to the beginning 392. An alternative augmented content item 396 is illustrated where the particular advertisement 386 is inserted within the particular video file 382 at a midpoint 393 that is between the beginning 392 and end 394 of video content the particular video file 382.

To insert the particular advertisement 386 into the particular video file 382, a controller, such as the controller 124, may decode at least a portion of the particular video file 382, traverse the particular video file 382, and update indices that are used to playback the particular video file 382 to append or insert the particular advertisement 386. The controller 124 may parse a sync word that identifies a start of a frame in the particular video file 382 and a bit rate to combine the particular advertisement 386 in a way that enables the augmented content item 390 including the particular advertisement 386 to be recognizable by a playback device. When the augmented content item 390 is presented to a host device or is stored in a third storage area 130 (FIG. 2), the augmented content item 390 is presented or stored as a same media type as the particular video file 382 (e.g., as an MP4 file).

As described with reference to the augmented content item 390, the placement rules 178 (FIG. 2) may specify a point in the particular video file 382 at which the particular advertisement 386 is inserted. The placement rules 178 may specify a fixed location relative to the particular video file 382 for insertion of the particular advertisement 386, such as at the beginning 392 of the particular video file 382 or at a point a specified number of minutes or seconds from the beginning 392 of the particular video file 382. Alternatively, the placement rules 178 may specify a relative location in the particular video file 382 at which the particular advertisement 386 is inserted depending on the running time of the particular video file 382. For example, the placement rules may specify that the particular advertisement 386 be inserted halfway through the particular video file 382, ten percent of the way through the particular video file 382, or at another point relative to the length of the particular video file 382. The placement rules 178 also may specify the placement of the particular advertisement 386 based on a length of the particular advertisement 386 and the length of the particular video file 382 so that, for example, an end of the particular advertisement 386 does not extend past the halfway point of the running time of the augmented content item 390.

FIGS. 3D and 3E schematically illustrate insertion points to illustrate how the user data may be augmented with supplemental content for clarity of explanation and not of limitation. Insertion of the particular advertisement within a particular file type may include decoding the particular file type, performing one or more transformations to retrieve original data or decoded data, replacement of the decoded data with advertisement data, re-encoding of the modified user data including the advertisement data, and re-storing as the augmented content data. Such operations may be performed at a controller of the data storage device in accordance with one or more rules, such as by the controller 124 at the data storage device 120 in accordance with the selection and/or placement rules 178.

Figure 4:
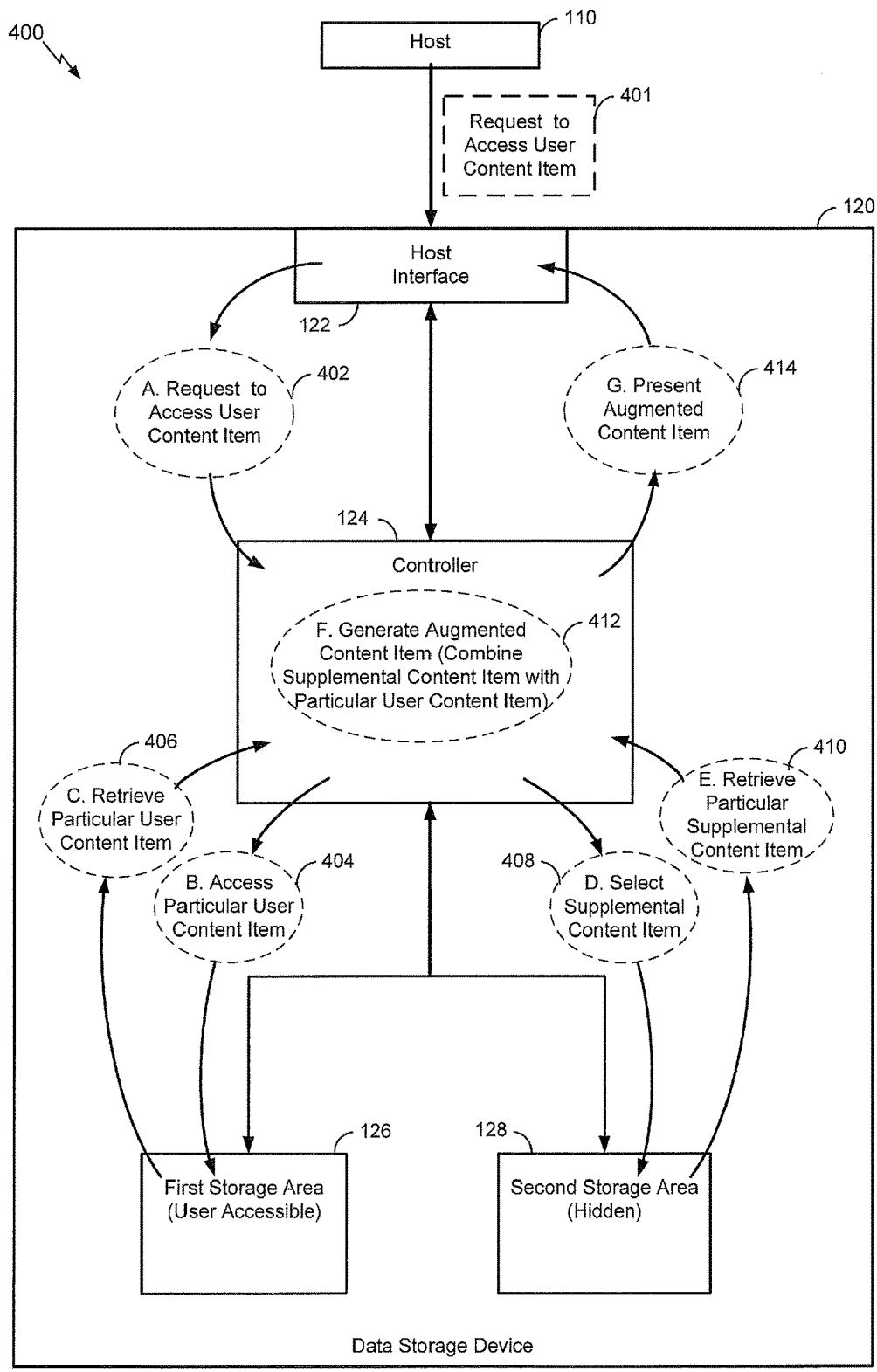
FIG. 4 is a data flow diagram showing an augmented content item being generated by combining a supplemental content item with a user content item in response to a request received via a host device to access the user content item.

FIG. 4 illustrates a particular embodiment of a data flow diagram of operations within the data storage device 120, where an augmented content item is generated "on the fly" in response to a request 401 to access user content items from the host 110 sent to the data storage device 120. The request 401 is received at the host interface 122 and may be provided to the controller 124, at 402. The controller 124 may initiate access to a particular user content item, at 404. The access may be initiated at the first storage area 126, and the particular user content item may be retrieved from the first storage area 126, at 406. After retrieving the particular content user item, at 406, the controller 124 may access the second storage area 128 to select supplemental content item, at 408. The selected particular supplemental content item may be retrieved by the controller 124, at 410. The controller 124 may generate an augmented content item, such as by combining the particular supplemental content item with the particular user content item, at 412, and may present the augmented content item at the host interface 122, at 414. For example, presenting the augmented content item may include providing the augmented content item to the host device 110 when the host device 110 has been operatively coupled to the data storage device 120 via the host interface 122.

Figure 5:
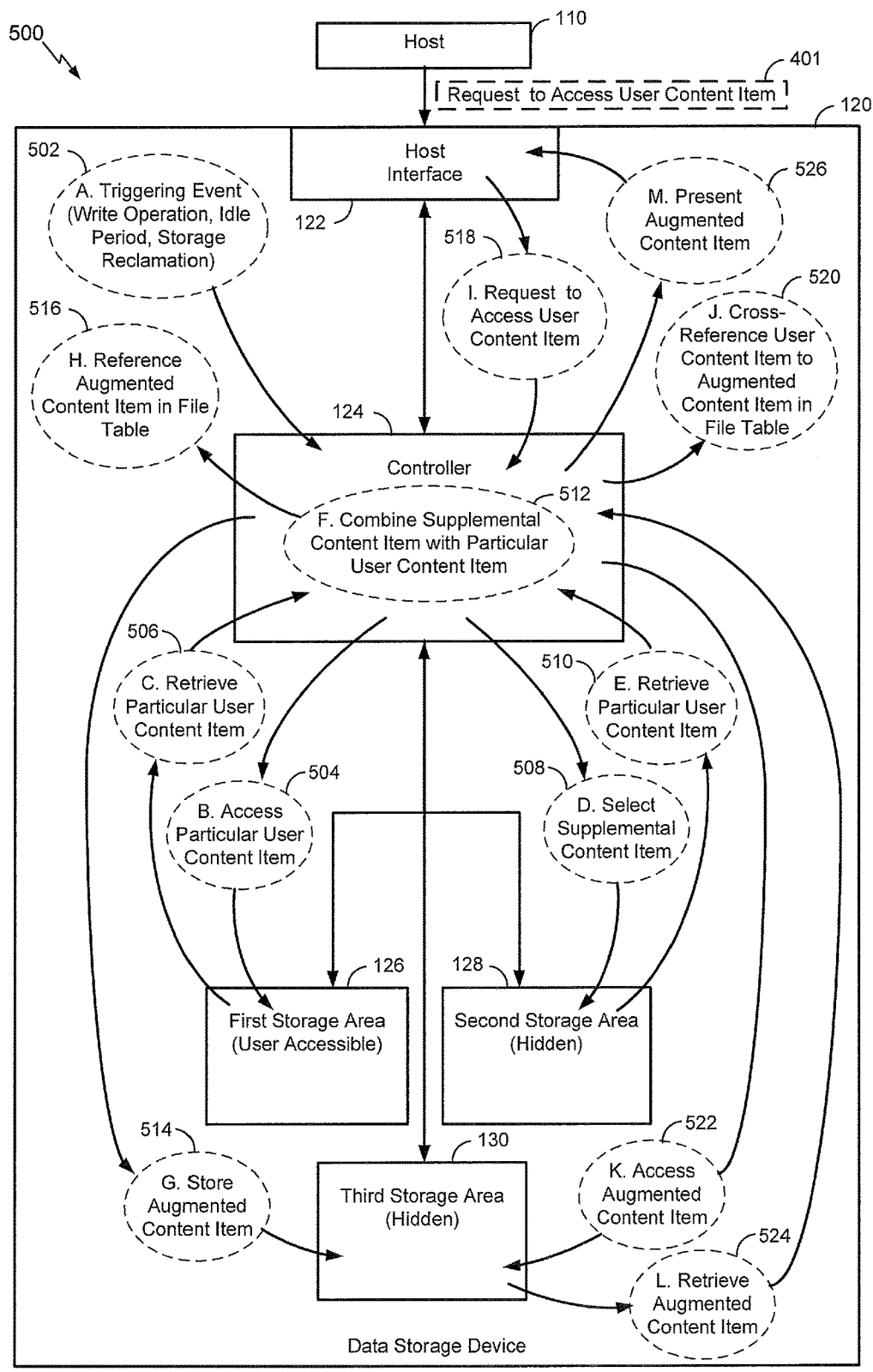
FIG. 5 is a data flow diagram showing an augmented content item being generated by combining a supplemental content item with a user content item and stored in a data storage device in a third storage area.

FIG. 5 depicts a particular embodiment of a data flow diagram of operations of the data storage device 120, where an augmented content item is generated independently of the request 401 from the host 110. A triggering event may be detected, at 502, by the controller 124. For example, the triggering event may include a write operation occurring at the first storage area 126, such as an addition of user content to the data storage device 120. Another example of a triggering event may be an idle period resulting from no read operations or write operations being performed at the data storage device 120 (e.g., read and write inactivity). As another example, the triggering event may be associated with commencement of or operation of a storage reclamation procedure (e.g., a "garbage collection") at the data storage device 120 into which the first storage area 126 is incorporated. In response to the triggering event, the controller 124 may initiate access to the first storage area 126 to access a particular user content item, at 504. The controller 124 may retrieve the particular user content item, at 506. After retrieving the particular user content item, the controller 124 may initiate selection of a supplemental content item, at 508. The supplemental content item may be stored at the second storage area 128. The controller 124 may retrieve the supplemental content item from the second storage area 128, at 510. The controller 124 may combine the supplemental content item with the particular user content item, at 512, to create an augmented content item that may be stored to the third storage area 130, at 514.

After storing the augmented content item to the third storage area, the data storage device 120, in response to the request to access the user content item sent from the host, a request to access the user content item is processed at 518. The controller 124 may access a file table, such as the file table 150 of FIG. 2, and may cross-reference the user content item to the augmented content item stored in the third storage area 130, at 520. Having cross-referenced the user content item to locate the augmented content item at the third storage area 130, the controller 124 may access the augmented content item, at 522, and retrieve the accessed augmented content item, at 524. The accessed augmented content item may be provided by the controller 124 to the host interface 122 to present the augmented content item at the host interface 122, at 526, and the augmented content item may be retrieved by the host 110.

Figure 6:
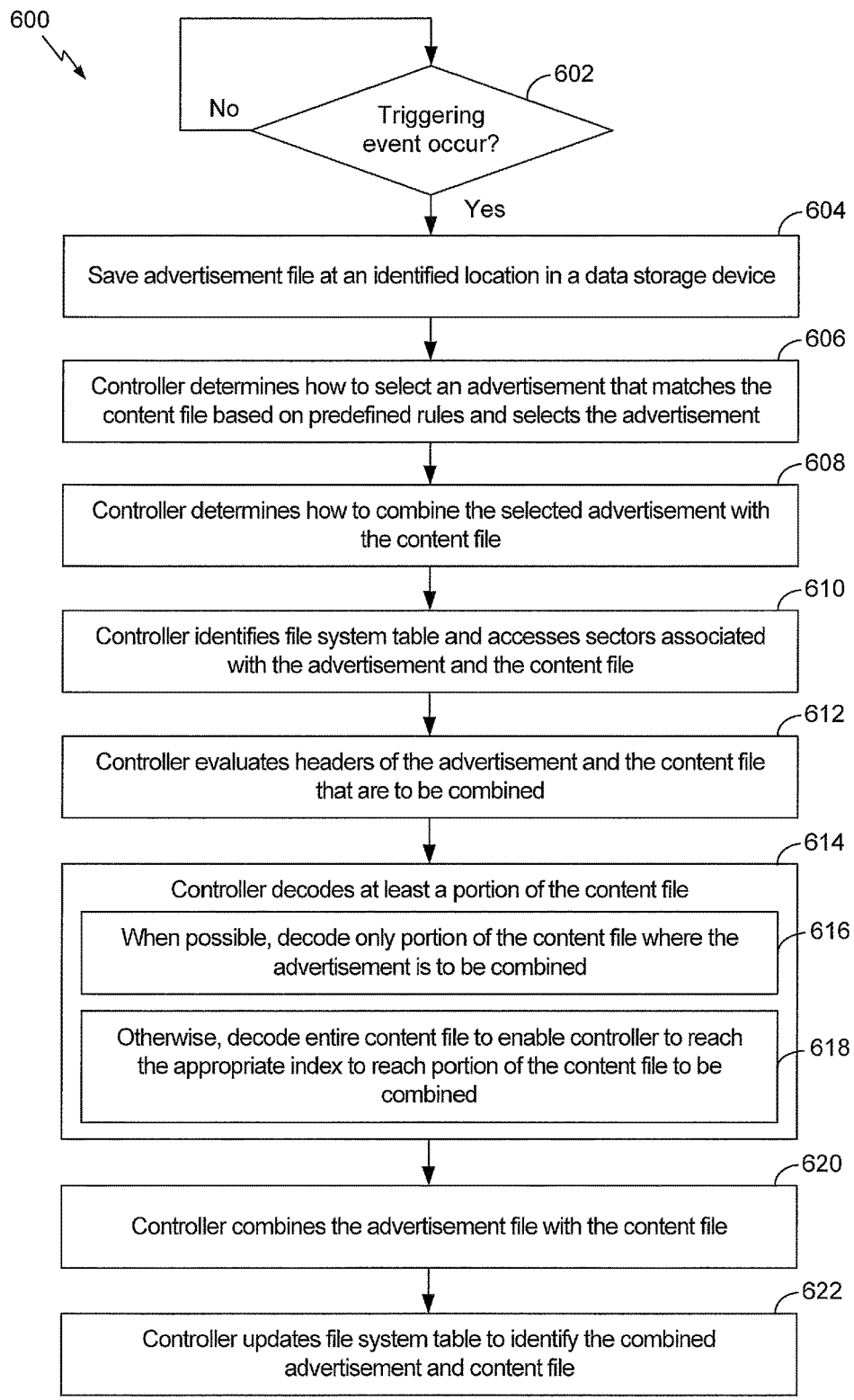
FIG. 6 is a flow diagram of an embodiment of a method of combining an advertisement with a content file.

FIG. 6 illustrates a flow chart of a specific embodiment of a method 600 of combining an advertisement with a content file. The method 600 includes determining whether a triggering event has occurred, at 602. Referring to FIG. 1, the controller 124 may determine whether a triggering event has occurred, such as by detecting a period of read and write inactivity at the data storage device 120, or detecting initiation of a "garbage collection process" (e.g., a storage reclamation procedure to enable erasing one or more sets of memory blocks from a first memory location by copying valid data from the sets of memory blocks). The method 600 continues, at 602, until a triggering event occurs. When the triggering event is detected, at 602, an application may be run at a controller of a data storage device to combine an advertisement with a content file. The advertisement may be saved at an identified location in the data storage device, such as in a hidden partition, at 604. The content file may be saved in a dedicated area for received user content. For example, the content file may be stored at the first storage area 126 of FIG. 1 and the advertisement may be stored at the second storage area 128.

A controller determines how to select an advertisement that matches the content file based on one or more predefined rules and selects the advertisement, at 606. For example, the controller 124 accesses the selection and/or placement rules 178 (FIG. 2) that may be stored in the controller 124, in the second storage area 128, or in another portion of the data storage device 120. The selection criteria also may be provided by information associated with the advertisements or other supplemental content items when an advertisement command pushes new or additional advertisements to the data storage device 120. The controller 124 reads one or more selection rules from the selection and placement rules 178 or from advertisement headers or metadata to determine how to match an advertisement with a content file. The controller 124 accesses the second storage area 128 or other portion of the data storage device 120 where the advertisements are stored to select an advertisement. Referring to FIG. 2, the controller 124 may access headers or metadata of the supplemental content items 170 and 174 to find advertisements that are within the size or duration thresholds to be used with the content file. The controller 124 also may compare attributes of the metadata 164 for the content file (e.g., the particular image 162) with attributes of the metadata 172 and 175.

The controller determines how to combine the selected advertisement with the content file, at 608. For example, the controller 124 may access the selection and placement rules 178 or rules provided with an advertisement command to determine the location of the advertisement relative to the content file. For example, when the content file is an image file, the rules may direct the controller to insert the advertisement in a particular corner or along a particular edge of the content file. For an audio or a video file, the rules may direct the controller to append the advertisement to the beginning of the content file or to insert the advertisement at the midpoint or at another point of the content file.

The controller identifies a file system table and tracks sectors associated with the advertisement and the content file, at 610. Referring to FIG. 2, the controller 124 may include firmware that enables the controller 124 to maintain or to access a file table 150 to identify sectors or blocks of memory that are associated with advertisement files and content files.

The controller evaluates headers of the advertisement and the content file that are to be combined or merged, at 612. Based on the header information, the controller determines what portions of the content file, if any, are to be decoded to combine the files.

For example, no decoding may be necessary for a JPEG or BMP image file and the controller may locate a particular index in the content file to replace the content at the located index with advertisement content. Otherwise, the controller may decode at least a portion of the content file, at 614. When possible, the controller decodes only the portion of the content file, as determined at 612, that is to be decoded to combine the files, at 616. Alternatively, when it is not possible to decode only a portion of the content file, the entire content file is decoded to enable the controller to access the appropriate index and to access the portion of the content file at which the advertisement is to be combined or inserted, at 618.

The controller combines the advertisement with the content file, at 620. For example, when the image content file is in a JPEG format, the controller 124 may delete the blocks at the location where the advertisement is to be inserted and replace the deleted blocks with the advertisement. When the image content file is in a BMP format, the controller 124 may determine the lines of the content file that are to be modified and replace those lines with the advertisement. When the content file includes an audio or video content file, rules may determine whether the controller 124 appends the advertisement to a beginning of an audio or video content file or whether the controller inserts the advertisement at a midpoint of the audio or video content file. For example, when the content file is an MP3 audio file or an MP4 video file, the controller 124 may decode at least a portion of the content file, traverse the content file, and update indices that are used to playback the content file to append or insert the advertisement. The controller 124 may parse a sync word that identifies a start of a frame in the content file and a bit rate of the content file to combine the advertisement in a way that enables the resulting combined file to be recognizable by the host device 110.

The controller updates the file system table to identify the combined advertisement and content file, at 622. For example, the controller 124 may store the combined file in the third storage area 130 of the data storage device from which the combined file may be later retrieved when a request is received via the host interface 122 to access the content file. The controller 124 may update the file table 150 so that the file system maintains the address of the combined file and so that the content file identifier cross-references the combined file to the content file.

Alternatively, instead of storing the combined file, the controller 124 may combine the image content file and the advertisement "on the fly" and present combined files to the host device 110 without storing the combined file. When the combined file includes audio or video media, for example, the advertisement may be provided followed by the content file with run time tracking and other audio content metrics updated such that the combined file appears to the host device 110 as a single file.

Figure 7:
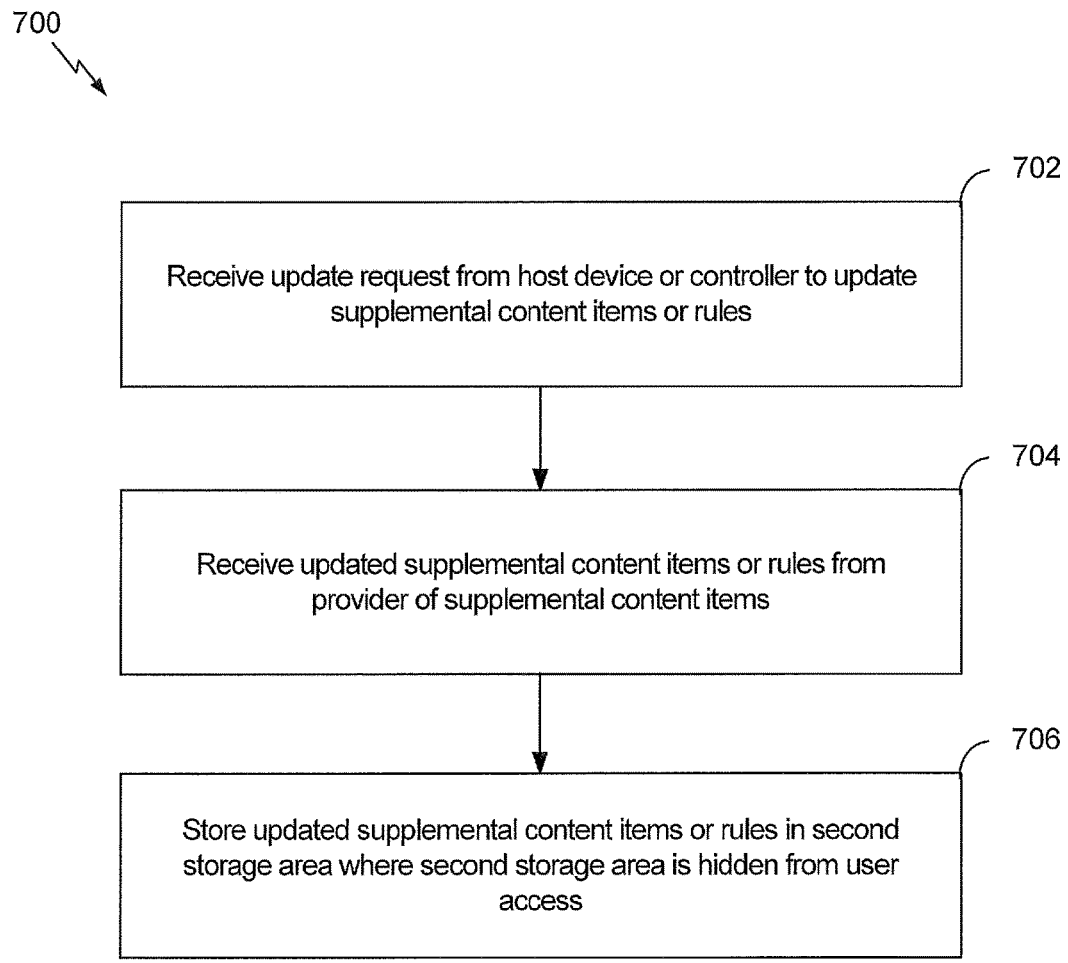
FIG. 7 is a flow diagram of an embodiment of a method to update supplemental content items stored in a data storage device.

FIG. 7 depicts a particular embodiment of a method of providing supplemental content items to a data storage device for insertion within user data. An update request is received from a host device or controller to update supplemental content items or rules, at 702. For example, when coupled to an external network via the external device/network interface 118 of FIG. 1, a message or command may be received from a provider of the supplemental content items 170 and 174 or from a provider of the data storage device 120 to update the supplemental content items 170 and 174. As another example, the controller 124 may be configured to seek an update, for example, at particular dates or times, after the controller 124 has generated a specified number of augmented content items 180 or 190 (FIG. 2), or after one or more of the supplemental content items 170 and 174 have been used more than a specified number of times. Upon detecting the specified condition, the controller 124 may initiate an update by presenting an update request via the host interface 122 to the host device 110 (FIG. 1). Alternatively, the host device 110 may present an update request. For example, a user may desire to update the supplemental content items and enter a command via the user interface 114 of the host device 110 that causes the processor 112 of the host device 110 to initiate a supplemental content item update via the memory device interface 116.

To verify that the request is received from a provider of supplemental content items and that a user is not attempting to eliminate the supplemental content items or change the rules to stop the introduction of the supplemental content items, the controller 124 may be configured to limit access to the supplemental content items and to the rules for combining the supplemental content items. As part of the update command, the source of the updated material may be authenticated to determine that new or additional supplemental content items or rules are being received from an authorized provider. A command header for an update presented to the data storage device 120 may include an authentication code. The controller 124 may be configured to read the authentication code and compare the authentication code to a stored code prior to granting access to the supplemental content items and to the rules for combining the supplemental content items.

New or additional supplemental content items or rules may be received, at 704. For example, the data storage device 120 may provide a commercial interface that includes an application command to add a commercial file. The application command may provide several items of information about the supplemental content. The update may identify the type or types of added content, such as identifying whether the update includes supplemental content in the form of images, music, video, or other types of media. The application command may specify placement rules for the supplemental content. For example, for an image file, the placement rules may specify at what location or coordinates the supplemental content is to be inserted. For an audio file or video file, the placement rules may indicate at what point in a running time of the audio file or the video file at which the supplemental content is to be inserted. The application command also may identify the size of the supplemental content files, such as a size of an image file or a running time or length of audio or video files. The application command also may specify a number of times or a frequency with which each of the supplemental content items is to be used.

The controller 124 may return information about the data storage device 130 via the host interface 122. The information may include, for example, whether the data storage device 130 has storage space in the second storage area 128 to accommodate the added commercial file or whether the controller's firmware supports addition of the file type of the added commercial file. The information may also include observed placement rules, such as by providing a bit map indicating a location at which an advertisement is to be inserted in an image file or by providing running time indicators specifying at what point an advertisement may be inserted into an audio or video file.

New or updated selection and placement rules received via the application command may be stored with the commercial file, such as in a header or in metadata, or stored in a separate file. For example, metadata of a supplemental content item may include a specified flag bit or status bit at a specified location, such as a bit zero location. When the new supplemental content item is of a dynamic audio or video media type and the specified flag bit has a zero value, the new supplemental content item may be inserted at a midpoint of the user content. Alternatively, when the new supplemental content item is of a dynamic audio or video media type and the specified flag bit has a one value, the new supplemental content item may be inserted at or appended to a beginning of the user content. New or additional supplemental content items of a static type, such as an image or a text type, may include similar flag or status bits that specify whether the supplemental content items are to be inserted in particular corners or along particular edges of the particular user content.

Updated supplemental content items or rules may be stored in a second storage area where the second storage area is hidden from user access, at 706. For example, the controller 124 may write the new or additional supplemental content items to locations in the second storage area 128 specified via the commercial interface. As a result, some of the new or additional supplemental content items may overwrite existing supplemental content items stored in the second storage area 128. Alternatively, the controller 124 may access the file table 150, which may maintain information about the availability of storage locations in the second storage area 128, and the controller 124 may store the new or additional supplemental content items at the available locations in the second storage area 128.

Figure 8:
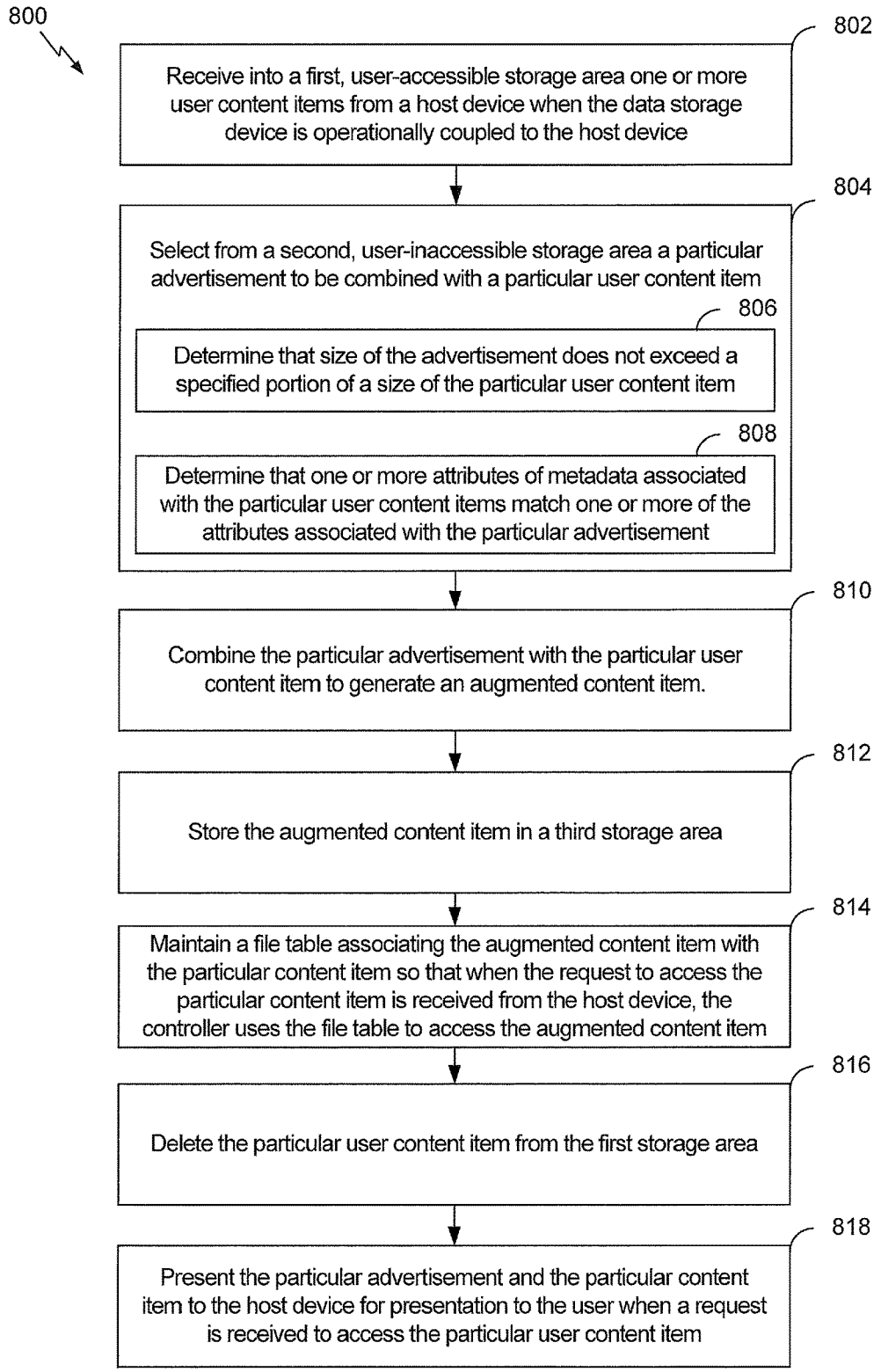
FIG. 8 is a flow diagram of an embodiment of a method to receive one or more user content items and combine the user content items with supplemental content items to generate one or more augmented content items at a data storage device.

Referring to FIG. 8, a particular embodiment of a method of receiving user content items and generating augmented content items at a data storage device is depicted and generally designated 800. The method 800 may be performed at a controller of a data storage device, such as the controller 124 of the data storage device 120. The data storage device includes a first storage area and a second storage area. The first storage area is accessible by a user, such as the first storage area 126 of FIG. 1. The second storage area is inaccessible to the user and is designated as the storage of one or more advertisements, such as the second storage area 128 of FIG. 1.

The method 800 includes receiving into a first, user-accessible storage area one or more user content items from a host device when the data storage device is operationally coupled to the host device, at 802. For example, with reference to the host device 110 and the data storage device 120 of FIG. 1, the user content item may be received from the host device 110 via a pre-defined data transfer specification protocol, such as a Secure Digital® (SD®) data transfer protocol for communication between the host device 110 and the data storage device 120. The user content items provided may be pre-recorded user content items, such as music files already stored on another data storage device that is accessible to the host device 110. Alternatively, the user content items may include data being contemporaneously captured by the host device, such as images captured by a digital camera, audio files captured by a digital audio recorder, or video files captured by a video recorder. In either case, the host device 110 may direct the user content items to the memory device interface 116 of the host device 110 where data describing the user content items is passed to the data storage device 120 via the host interface 122 of the data storage device 120.

When the one or more user content items are received from the host device at 802, data representing the user content items is received by the controller 124 via the host interface 122. The controller 124 causes the data representing the user content items to be stored at available locations in the first storage area 126. The controller 124 may consult the file table 150 to identify available storage locations in the first storage area 126. The data will be stored as user content items 136 in the first storage area 126. Referring to FIG. 2, the controller 124 will cause an entry to be created in the file table 150, which may include a FAT or a file directory, to log the location of the user content item in the first storage area 126. Encoded data may be received at the data storage device 120 via the host interface 120 when the host interface 120 is operationally coupled to the memory device interface 116. The host interface 122 or the controller 124 may be configured to decode or decompress the received data. If the controller 124 is not configured or otherwise not able to perform the decompression, the controller 124 may communicate the compressed data via the host interface 122 to the host device 110 (FIG. 1) to enable the host device 110 to decompress the data.

Referring again to FIG. 8, from a second, user-inaccessible storage area, a particular advertisement is selected to be combined with a particular user content item, at 804. The particular advertisement may be selected, in part, upon determining that the size of the advertisement does not exceed a specified portion of a size of the particular user content, at 806. When the particular user content item 162 is of a static media type, the selection and placement rules 178 may limit a size of the supplemental content item 170 to, for example, not more than ten percent of the content of the file. Thus, the controller 124 may access the header or the metadata of the particular user content item to determine the size of the particular user content item. The controller 124 then may access the supplemental content items in the second storage area 128 and identify one or more of the supplemental content items that have a size that does not exceed the size limit. Alternatively, the controller 124 may reduce a size of a supplemental content item to satisfy the stated size threshold. When the particular user content item 162 is of the dynamic type, the supplemental content item may be constrained to being of a duration that does not exceed a specified duration or a specified portion of the running time of the particular user content.

The particular advertisement also may be selected, in part, by matching one or more attributes of the metadata associated with the particular user content item with one or more of the attributes associated with the particular advertisement, at 808. The controller 124 may access the selection and placement rules 178 stored separately in the second storage area 128 or stored as part of the supplemental content items to identify one or more metadata attributes to match, as described at 606 of FIG. 6.

Once the particular advertisement is selected at 804, the particular advertisement is combined with the particular user content item to generate an augmented content item, at 810. For a particular user content item of a static media type being combined with a particular advertisement of a static media type, the particular advertisement is inserted in or superimposed over a specified portion of the particular user content item as described with reference to 610 of FIG. 6. For a particular user content item of a dynamic media type being combined with a particular advertisement, the particular advertisement is inserted at a beginning of or at a midpoint of the dynamic particular user content item as described with reference to 620 of FIG. 6.

Combining the particular advertisement (i.e. the particular supplemental content item) with the particular user content item may be performed by identifying a location within the particular user content item corresponding to a specified location to insert the particular supplemental content item and writing data from the particular supplemental content item to the identified location within the particular user content item. For example, identifying the location may include reading an indication of the specified location from a rule corresponding to the particular supplemental item, reading the file table to identify one or more consecutive regions of data corresponding to the particular user content item, and sequentially accessing the one or more consecutive regions of data until a position index within an accessed region corresponds to the specified location. For example, a region of data may correspond to a cluster, a logical block address (LBA), a block, a page, a sector, or other unit.

When the particular user content item is an image file such as a JPEG file, writing the data to the identified location may include deleting one or more blocks of image data at the identified location and replacing the one or more deleted blocks with data corresponding to the particular advertisement. When the particular user content item is an image file having a bitmap format, writing the data to the identified location may include deleting one or more lines of image data at the identified location and replacing the one or more deleted lines with data corresponding to the particular advertisement.

When the particular user content item is an audio or video file, writing the data to the identified location may include decoding at least a portion of the particular user content item to generate decoded data corresponding to the identified location. For example, the decoding may include an entropy decoding of one or more frames within the audio file or the video file. The decoded data corresponding to the identified location may be replaced with advertisement data of the particular advertisement, and the portion of the particular user content item including the advertisement data may be re-encoded, such as an entropy encoding. As another example, when the identified location is a beginning of the audio or video file, such as when the advertisement is to be appended to the user content item "on the fly," writing the data to the identified location may include initiating a playback of the particular advertisement and initiating a playback of the particular user content item after playback of the particular advertisement. The playback of the user content item and the particular advertisement may be sequentially performed to result in a continuous or near-continuous playback data stream that is presented to a host device. One or more tracking metrics, such as a run time tracking metric, during the playback of the particular user content item may be updated such that the particular advertisement and the particular user content item are presented as a single audio or video file.

An augmented content item may be presented "on the fly" or the augmented content item may be stored in the third storage area 130, at 810. When the particular augmented content item 180 is to be stored, the controller 124 accesses the file table 150 to identify an available storage location in the third storage area 130 that can accommodate the particular augmented content item. The controller 124 then stores the augmented content item at the identified storage location and updates the file table to identify where the particular augmented content item is stored.

The file table associating the augmented content item with the particular user content item is maintained so that, when a request to access the particular user content item is received from the host device, the controller can use the file table to access the augmented content item, at 814. After the controller 124 causes the augmented content item to be stored in the third storage area 130 and enters the augmented content item in the file table 150 as described with reference to 810, the controller 124 associates the particular user content item included in the augmented content item with the augmented content item. Thus, when the request is received by the controller 124 via the host device 110 to access the particular user content item 132, the controller 124 can access an entry in the file table 150 that references the particular user content item 132 to be redirected to the augmented content item stored in the third storage area 130.

After the augmented content item including the particular user content item is stored at 812 and the file table is maintained to redirect requests for the particular user content item at 814, the particular user content item is deleted from the first storage area, at 816. When the particular user content item 132 is not combined with the particular advertisement "on the fly" and is stored in the third data storage area 130, because the particular user content item 132 is thereafter presented as part of the augmented content item, the storage area occupied by the particular user content item 132 can be released to receive other user content items. Thus, the controller 124 updates the file table 150 to identify the storage locations occupied by the particular user content item 132 as free. The freed storage locations may be erased by the controller 124 as part of a block erase. The freed storage locations may be collected by the controller 124 as part of a storage reclamation (i.e., "garbage collection") process.

When a request is received to access the particular user content item, the particular advertisement and the particular content item are presented to the host device for presentation to the user, at 818. The particular advertisement and the particular content item may be generated "on the fly" as described with reference to 610 and 620 of FIG. 6. Alternatively, when the particular advertisement and the particular user content item are stored together as the particular augmented content item 180 in the third storage area 130, when the controller 124 receives the request for the particular user content item, the controller 124 accesses the file table 150 to determine the augmented content item that includes the particular user content item 132. The controller 124 then passes the augmented content item 180 to the host interface 124 such as by using a Secure Digital® (SD®) data transfer protocol for communication between the host device 110 and the data storage device 120.

Although the method 800 of FIG. 8 includes storing the augmented content item, maintaining the file table, and deleting the original user content item, at 812-816, in other embodiments the augmented content item may be generated "on the fly" and storage, maintenance, and deletion as recited at 812-816 may be omitted.

Although various components depicted herein are illustrated as block components and described in general terms, such components may include one or more microprocessors, state machines, or other circuits configured to enable the data storage device 120 to perform the particular functions attributed to such components, or any combination thereof. For example, the controller 124 may represent one or more physical components, such as hardware controllers, state machines, logic circuits, or other structures to enable the data storage device 120 of FIG. 1 to combine user content items with supplemental content items.

In a particular embodiment, the data storage device 120 may be a portable device configured to be selectively coupled to one or more external devices. However, in other embodiments, the data storage device 120 may be attached or embedded within one or more host devices, such as within a housing of a portable communication device. For example, the data storage device 120 may be within a packaged apparatus such as a wireless telephone, a personal digital assistant (PDA), gaming device or console, a portable navigation device, or other device that uses internal non-volatile memory. In a particular embodiment, the data storage device 120 includes a non-volatile memory, such as a flash memory (e.g., NAND, NOR, Multi-Level Cell (MLC), Divided bitline NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data storage device comprising:
  a memory including a first storage area, a second storage area, and a third storage area;
  a host interface configured to receive content items from and present content items to a host device; and
  a controller coupled to the host interface and to the memory, wherein the controller is configured to:
    maintain a file table that includes a file allocation table (FAT) that includes one or more entries;
    store one or more user content items in the first storage area, wherein the one or more user content items include a user content item;
    in response to detecting a trigger event that includes initiation of a storage reclamation procedure:
      access an advertisement from the second storage area;
      combine the advertisement with the user content item to generate an augmented content item;
      add an indicator to metadata of the augmented content item to indicate that the augmented content item has been augmented such that further addition of additional advertisement is prevented, wherein the indicator is undetectable by a human during playback of the augmented content item;
      store the augmented content item in a location of the third storage area;
      update the file table so that a first file table entry associated with the user content item is cross-referenced to a second file table entry associated with the augmented content item, the second file table entry indicating the location of the augmented content item in the third storage area; and
      delete the user content item from the first storage area in response to updating the file table and in connection with the storage reclamation procedure; and
    responsive to a request from the host device for the user content item, retrieve the augmented content item based on the file table.

2. The data storage device of claim 1, wherein the controller is further configured to access the first file table entry in response to the request, to cross-reference the first file table entry to the second file table entry, and to redirect the request from the first storage area to the third storage area based on the second file table entry.

3. The data storage device of claim 2, wherein the controller is further configured to generate the augmented content item independently of receiving the request from the host device to initiate presentation of the user content item.

4. The data storage device of claim 1, wherein the controller is further configured to decode a portion but not all of the user content item prior to combining the advertisement with the user content item.

5. The data storage device of claim 1, wherein the controller is further configured to generate the augmented content item in response to receiving a request from the host device to initiate presentation of the user content item.

6. The data storage device of claim 1, wherein the controller is further configured to use one or more rules stored in the second storage area to:
  select the advertisement; and
  place the advertisement into the user content item, wherein:
    the user content item includes an image, and the one or more rules directing placement specify coordinates in the image where the advertisement is to be inserted; or
    the user content item includes an audio file or a video file, and the one or more rules directing placement specify a point in a running time of the audio file or the video file at which the advertisement is to be inserted.

7. The data storage device of claim 6, wherein one of the rules specifies a number of times each of a plurality of advertisements is combined with the one or more user content items.

8. The data storage device of claim 1, wherein the controller is further configured to select the advertisement from a plurality of advertisements based on matching one or more attributes associated with the advertisement with one or more attributes of a metadata portion of the user content item, wherein the metadata portion comprises one or more of:
  a topic of the user content item;
  an author of the user content item;
  a performer of the user content item;
  a genre of the user content item; and
  a keyword associated with the user content item.

9. The data storage device of claim 1, wherein one or more advertisements stored in the second storage area are updatable by a command received via the host interface, the command including authentication information to distinguish an originator of the command from a device end-user.

10. The data storage device of claim 1, wherein the controller is further configured to:
  identify an insertion point to insert the advertisement, and
  write data from the advertisement at the insertion point.

11. The data storage device of claim 10, wherein the controller is further configured to:
  read an indication of the insertion point from a rule corresponding to the advertisement;
  read the file table to identify one or more consecutive regions of data corresponding to the user content item; and sequentially access the one or more consecutive regions of data until a position index within an accessed region corresponds to the insertion point.

12. The data storage device of claim 10, wherein the user content item includes an audio file including encoded audio content or a video file including encoded video content, and wherein the controller is further configured to:
    decode a portion of the encoded audio content or the encoded video content of the user content item to generate decoded data;
    replace the decoded data corresponding to the insertion point with advertisement data of the advertisement; and
    re-encode the portion of the user content item including the advertisement data.

13. The data storage device of claim 12, wherein the controller is further configured to decode the portion using an entropy decoding technique and to re-encode the portion using an entropy encoding technique.

14. The data storage device of claim 10, wherein the user content item includes an audio or video file, wherein the insertion point corresponds to a beginning of the audio or video file, and wherein the controller is further configured to:
    initiate playback of the advertisement;
    initiate playback of the user content item after the playback of the advertisement; and
    update one or more tracking metrics of the user content item such that the advertisement and the user content item are presented as a single audio or video file.

15. The data storage device of claim 14, wherein the one or more tracking metrics comprise a run time tracking metric configured such that a particular advertisement is presented as a single file with the user content item.

16. The data storage device of claim 1, wherein the advertisement is one of a plurality of advertisements stored in the second storage area, wherein the controller is further configured to maintain tracking data associated with the plurality of advertisements and to select the advertisement based on the tracking data, and wherein the tracking data indicates a most recently used advertisement of the plurality of advertisements and a least recently used advertisement of the plurality of advertisements.

17. The data storage device of claim 1, wherein the controller is further configured to:
    request an update of one or more advertisements stored in the second storage area, wherein the update is requested by the controller after generating a number of augmented content items or at a day or a time;
    receive update data from an advertisement provider or a service provider from a remote network via the host device; and
    update the one or more advertisements based on the update data.

18. The data storage device of claim 1, wherein the controller is further configured to determine whether to decode a portion of the user content item or to decode none of the user content item based on a comparison of first header information of the user content item and second header information of the advertisement.

19. The data storage device of claim 18, wherein the controller is further configured to determine whether the user content item and the advertisement are of a same media type based on the first header information and the second header information.

20. The data storage device of claim 19, wherein the same media type is an image type, and wherein the controller is further configured to combine the user content item and the advertisement without decoding any of the user content item.

21. The data storage device of claim 1, wherein the controller is further configured to determine whether to decode all of the user content item to enable combining the user content item with the advertisement and to decode all of the user content item to determine an insertion point corresponding to a location in the user content item to insert the advertisement.

22. The data storage device of claim 1, wherein the data storage device is configured to be removably coupled to the host device via the host interface as a removable flash drive.

23. The data storage device of claim 22, wherein the data storage device is one of a memory card or a universal serial bus (USB) flash drive.

24. The data storage device of claim 1, wherein the data storage device is configured to be embedded in the host device as an embedded flash drive.

25. The data storage device of claim 1, wherein the advertisement includes a preloaded advertisement in the second storage area, and wherein the preloaded advertisement at least partially offsets a cost to make or distribute the data storage device.

26. The data storage device of claim 1, wherein the controller is further configured to provide information to the host device, the information indicating one or more of whether a storage space associated with the memory is sufficient to store the augmented content item or whether the controller supports a file type of the augmented content item.

27. An apparatus comprising:
    means for storing data and including:
        means for storing one or more user content items;
        means for storing a plurality of advertisements, wherein access to the means for storing the plurality of advertisements is restricted; and
        means for storing one or more augmented content items;
    means for receiving content items from and for sending the content items to a host device; and
    means for controlling operations to the means for storing data and for:
        maintaining a file table that includes a file allocation table (FAT) that includes one or more entries;
        sending a user content item to be stored in the means for storing the one or more user content items;
        sending an advertisement to be stored in the means for storing the plurality of advertisements;
        in response to detecting a trigger event that includes initiation of a storage reclamation procedure, combining the advertisement with the user content item to generate an augmented content item of the one or more augmented content items, adding an indicator to metadata of the augmented content item to indicate that the augmented content item has been augmented such that further addition of additional advertisement is prevented, wherein the indicator is undetectable by a human during playback of the augmented content item, storing the augmented content item in a location of the means for storing the one or more augmented content items, updating the file table so that a first file table entry associated with the user content item is cross-referenced to a second file table entry associated with the augmented content item, the second file table entry indicating the location of the augmented content item in the means for storing the one or more augmented content items, and deleting, in response to updating the file table and in connection with the storage reclamation procedure, the user content item from the means for storing the one or more user content items; and responsive to receiving a request from the host device for access to the user content item, retrieving the augmented content item from the means for storing the one or more augmented content items based on the file table and sending the augmented content item to the host device using the means for receiving and for sending.

28. The apparatus of claim 27, wherein the request for access to the user content item is received from the host device, and wherein the means for controlling operations is configured to use the file table to locate the augmented content item.

29. The apparatus of claim 27, wherein the means for controlling operations is configured to:

receive updated advertisements from the host device; and store the updated advertisements in the means for storing the plurality of advertisements.

30. The apparatus of claim 29, wherein the updated advertisements are received by the host device from a network location.

31. The apparatus of claim 27, wherein the means for controlling operations is configured to initiate the storage reclamation procedure to erase one or more memory blocks of the means for storing data by copying valid data from the one or more memory blocks.

32. The apparatus of claim 27, wherein the means for controlling operations is responsive to one or more rules that direct at least one of:

selection of the advertisement; or placement of the advertisement relative to the user content item in the augmented content item.

33. A method comprising:

at a controller of a data storage device, the data storage device including a host interface and a memory including a first storage area, a second storage area, and a third storage area, wherein the first storage area is accessible by a user, wherein the controller stores a file table that includes a file allocation table (FAT) that includes one or more entries, and wherein the second storage area is inaccessible to the user and stores one or more advertisements:

receiving, by the controller, one or more user content items from a host device;

determining, by the controller, whether a user content item of the one or more user content items stored in the first storage area includes one or more advertisements based on metadata of the user content item;

in response to detecting a trigger event that includes detection of a period of read and write inactivity at the memory and that further includes initiation of a storage reclamation procedure:

combining, by the controller, an advertisement of the one or more advertisements with the user content item to generate an augmented content item;

adding, by the controller, an indicator to metadata of the augmented content item to indicate that the augmented content item has been augmented such that further addition of additional advertisement is prevented, wherein the indicator is undetectable by a human during playback of the augmented content item;

storing, by the controller, the augmented content item in a location of the third storage area;

updating, by the controller, the file table so that a first file table entry associated with the user content item is cross-referenced to a second file table entry associated with the augmented content item, the second file table entry indicating the location of the augmented content item in the third storage area; and deleting the user content item from the first storage area in response to updating the file table and in connection with the storage reclamation procedure.

34. The method of claim 33, wherein the memory includes a non-volatile memory.

35. The method of claim 33, wherein the augmented content item is generated before receiving a request from the host device to access the user content item from the first storage area.

36. The method of claim 33, further comprising, in response to receiving a request for the user content item from the host device, retrieving the augmented content item based on the second file table entry.

37. The method of claim 33, wherein the user content item is of an image type, and wherein combining the advertisement with the user content item includes superimposing the advertisement over a portion of the user content item.

38. The method of claim 33, wherein the user content item is of a dynamic type, and wherein combining the advertisement with the user content item includes one of:

appending the advertisement to a beginning of the user content item; and inserting the advertisement between a beginning and an end of the user content item.

39. The method of claim 33, further comprising selecting the advertisement from the one or more advertisements such that a size of the advertisement does not exceed a specified portion of a size of the user content item.

40. The method of claim 33, further comprising selecting the advertisement from the one or more advertisements based on matching one or more attributes associated with the advertisement with one or more attributes of the metadata of the user content item.

41. The method of claim 33, wherein combining the advertisement with the user content item is performed by:

identifying an insertion point within the user content item, and writing data from the advertisement to the insertion point within the user content item.

42. The method of claim 33, further comprising:

accessing a file system of the data storage device to retrieve a listing of available files that can be accessed by the host device; and receiving a selection from the host device of an available file from the listing of the available files, wherein the available file corresponds to the user content item.

43. The method of claim 42, further comprising:

accessing the file table in response to the selection, wherein the file table indicates an insertion point of the user content item; and providing the augmented content item to the host device.

44. The method of claim 33, wherein updating the file table further includes:

accessing the file table to locate portions of the user content item stored throughout the data storage device; and based on one or more consecutive portions of the located portions, identifying an insertion point at which the advertisement is to be inserted in the user content item.

45. The method of claim 44, wherein the consecutive portions correspond to one or more clusters, logical block addresses (LBAs), blocks, pages, or sectors.

* * * * *